United States Patent
Tripp et al.

(10) Patent No.: US 11,770,372 B2
(45) Date of Patent: Sep. 26, 2023

(54) UNIFIED IDENTITY AND ACCESS MANAGEMENT (IAM) CONTROL PLANE FOR SERVICES ASSOCIATED WITH A HYBRID CLOUD

(71) Applicant: Hewlett Packard Enterprise Development LP, Houston, TX (US)

(72) Inventors: Travis Tripp, Ft. Collins, CO (US); Craig W. Bryant, Ft. Collins, CO (US); Ryan Brandt, Ft. Collins, CO (US); Sonu Sudhakaran, Bangalore Karnataka (IN); Joseph Keen, Ft. Collins, CO (US); Andrea Adams, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 114 days.

(21) Appl. No.: 16/940,594

(22) Filed: Jul. 28, 2020

(65) Prior Publication Data

US 2022/0038449 A1 Feb. 3, 2022

(51) Int. Cl.
*H04L 9/40* (2022.01)
*H04L 67/02* (2022.01)
(Continued)

(52) U.S. Cl.
CPC .......... *H04L 63/0815* (2013.01); *H04L 41/22* (2013.01); *H04L 41/28* (2013.01);
(Continued)

(58) Field of Classification Search
CPC ... H04L 63/0815; H04L 41/22; H04L 63/101; H04L 63/20; H04L 67/02; H04L 41/28
See application file for complete search history.

(56) References Cited

U.S. PATENT DOCUMENTS

2014/0280595 A1* 9/2014 Mani ............... H04L 67/10
709/204
2015/0135257 A1* 5/2015 Shah ............... H04L 63/105
726/1

(Continued)

FOREIGN PATENT DOCUMENTS

CN 109815010 A 5/2019
WO WO-2015099607 A1 7/2015

OTHER PUBLICATIONS

L. Duchateau, "Atos Launches New Unified Cloud Identity and Access Management Solution for Ultimate Security," May 13, 2019, pp. 1-3, Retrieved from the Internet on Feb. 28, 2020 at URL: <atos.net/en/2019/press-release_2019_05_13/atos-launches-new-unified-cloud-identity-and-access-management-solution-for-ultimate-security>.

(Continued)

*Primary Examiner* — Cheng-Feng Huang
(74) *Attorney, Agent, or Firm* — Sheppard Mullin Richter & Hampton LLP

(57) ABSTRACT

Embodiments described herein are generally directed to integration of multiple services across multiple clouds within a unified IAM control plane. According to an example, an MSP provides (i) a user interface through which users of multiple tenants are able to configure permissions for and access multiple resources of a set of services associated with a hybrid cloud; and (i) a unified IAM control plane across the set of services, each of which potentially uses a different IAM protocol or scheme. A centralized IAM service is maintained by the MSP containing information regarding the permissions for the resources. Multiple service integrations for the set of services are supported by the MSP, including providing a first set of APIs that facilitate a direct integration with the unified IAM control plane in which the (Continued)

centralized IAM service maintains access control information for resources associated with a first service of the set of services.

16 Claims, 14 Drawing Sheets

(51) Int. Cl.
    *H04L 41/22*     (2022.01)
    *H04L 41/28*     (2022.01)

(52) U.S. Cl.
    CPC ............ *H04L 63/101* (2013.01); *H04L 63/20* (2013.01); *H04L 67/02* (2013.01)

(56) References Cited

U.S. PATENT DOCUMENTS

| | | | |
|---|---|---|---|
| 2018/0013763 A1* | 1/2018 | Wilson | H04L 63/101 |
| 2019/0297079 A1* | 9/2019 | Delcourt | H04L 63/20 |
| 2020/0007530 A1* | 1/2020 | Mohamad Abdul | H04W 12/009 |
| 2020/0007555 A1* | 1/2020 | Jadhav | H04L 67/1097 |

OTHER PUBLICATIONS

Sysfore Technologies, "Best Practices of Identity Access Management (IAM)," 2016, pp. 1-4.

\* cited by examiner

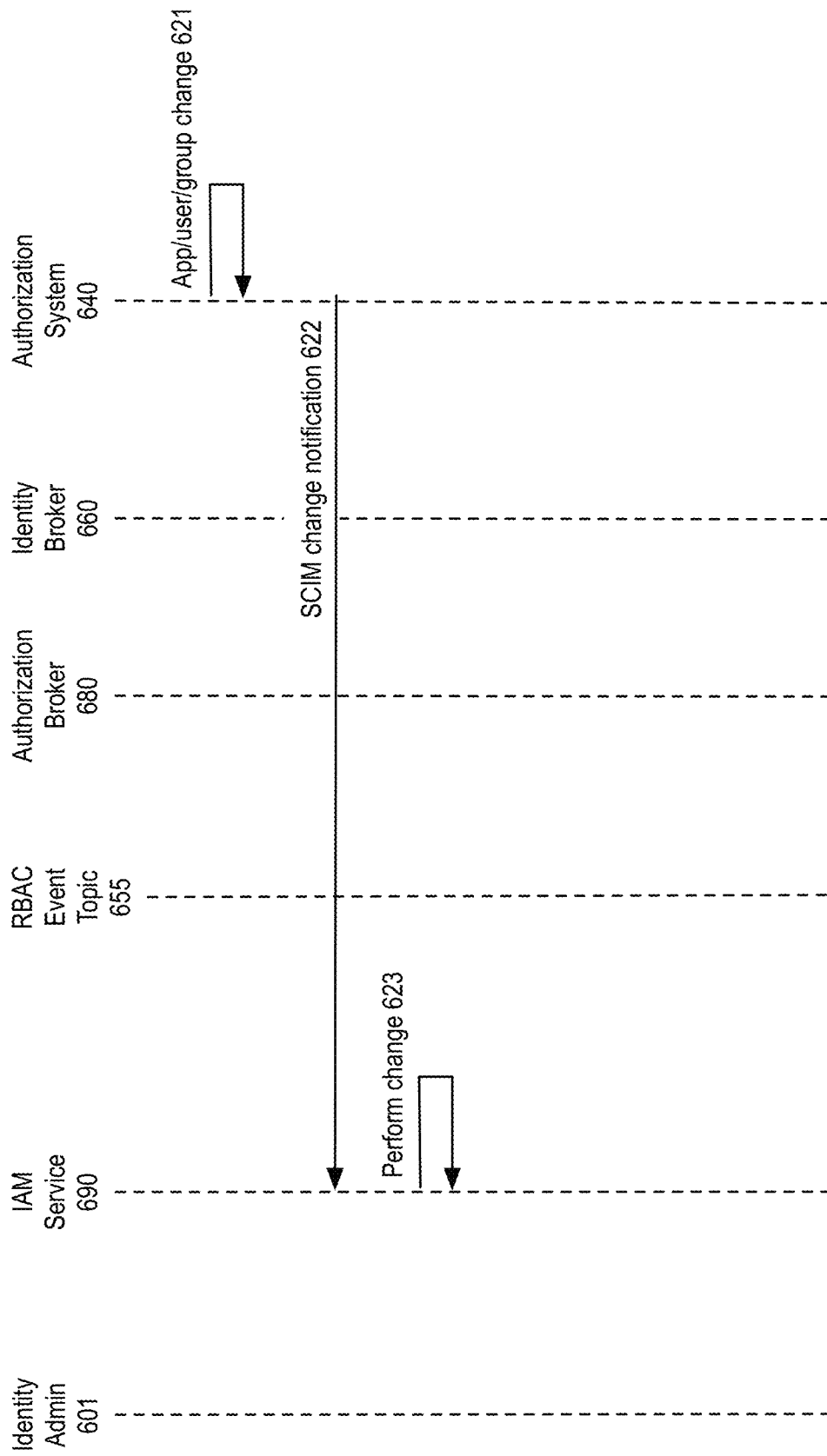

UNIFIED IDENTITY AND ACCESS MANAGEMENT (IAM) CONTROL PLANE FOR SERVICES ASSOCIATED WITH A HYBRID CLOUD

BACKGROUND

Identity and Access Management (IAM) may be used, for example, to define and manage roles and access privileges to ensure authorized users of a service or set of services associated with a public or private cloud have appropriate access to associated resources. IAM protocols may facilitate the transfer of authentication information by exchanging a series of messages that are designed to protect data as it travels through networks or between servers.

Common identity management standards handle user requests for access to protected data, applications, services and/or resources and deliver responses based on the information a user provides. When the user-supplied information, such as a password or biometric identifier, is correct, the IAM protocol allows the request consistent with the level of access assigned by an identity administrator to the user within the system at issue.

There are a variety of IAM protocols and schemes (e.g., role-based access control (RBAC), access-control lists (ACLs) and attribute-based access control (ABAC)). Examples of on-premises solutions include Lightweight Directory Access Protocol (LDAP) and Remote Authentication Dial-In User Service (RADIUS). The use of third-party authentication via identity management providers (e.g., Okta, Microsoft Azure Active Directory (AD), and Ping Identity) (which may also be referred to herein as identity providers) by IAM protocols (e.g., the Security Assertion Markup Language (SAML) protocol, OpenID Connect (OIDC), and the System for Cross-domain Identity Management (SCIM)) eliminates the need for storage of login credentials within the system for which they are used, thereby providing a solution for organizations seeking to prevent the misuse or abuse of login credentials and reducing the risk of data breaches.

BRIEF DESCRIPTION OF THE DRAWINGS

Embodiments described here are illustrated by way of example, and not by way of limitation, in the figures of the accompanying drawings in which like reference numerals refer to similar elements.

FIG. 6C is a message sequence diagram illustrating reflection of a user or group change via System for Cross-domain Identity Management (SCIM) to a centralized IAM in accordance with an example embodiment.

DETAILED DESCRIPTION

Figure 1:
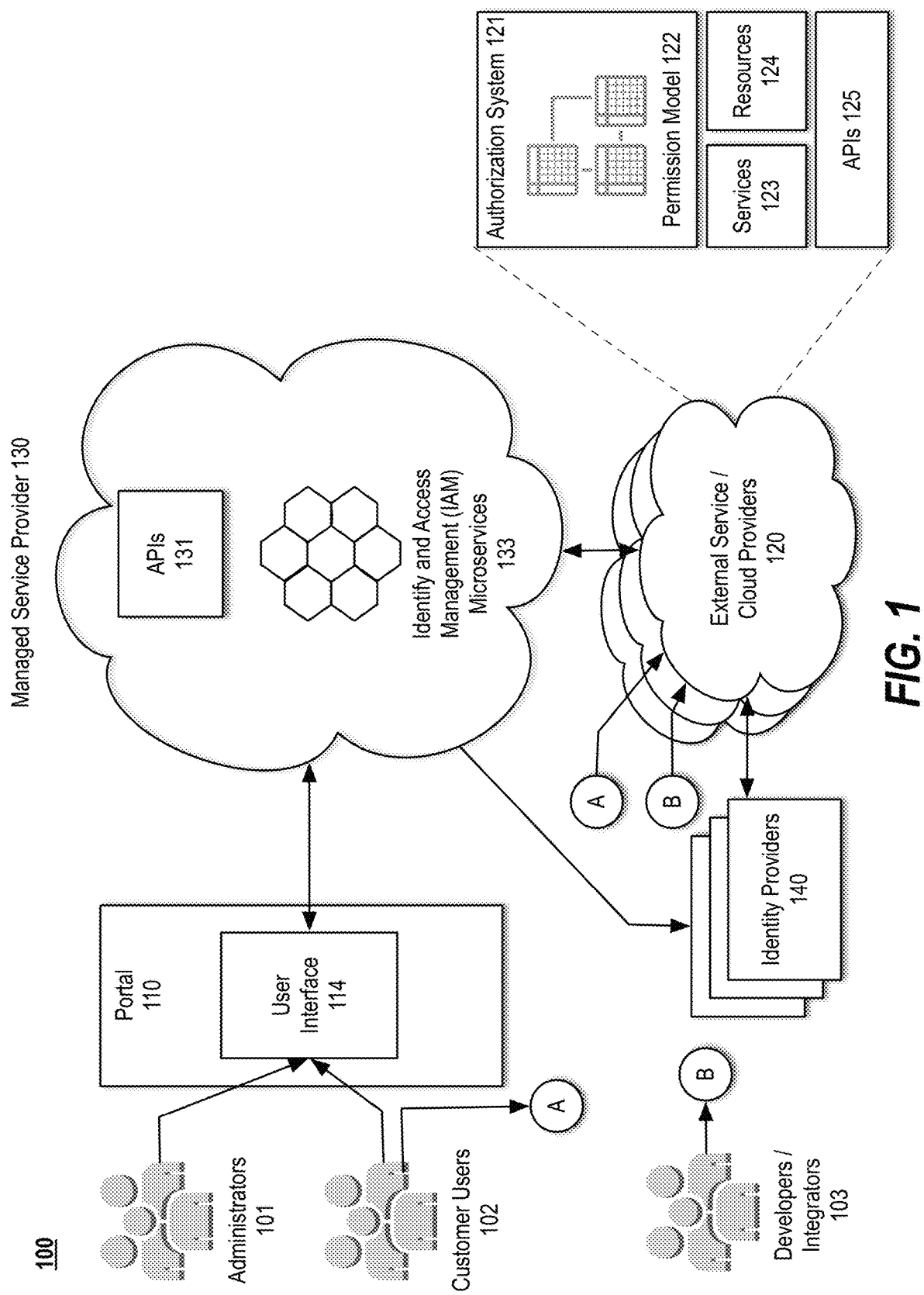
FIG. 1 is a block diagram conceptually illustrating a hybrid cloud environment in accordance with an example embodiment.

Embodiments described herein are generally directed to integration of multiple services across multiple clouds within a unified IAM control plane, which facilitates providing a unified user experience via the same user interface (UI), for example. In the following description, numerous specific details are set forth in order to provide a thorough understanding of example embodiments. It will be apparent, however, to one skilled in the art that embodiments described herein may be practiced without some of these specific details.

IAM is a core control plane for software and services. A managed service provider (MSP) typically uses a multitude of services from many different providers each of which utilizes different IAM control schemes and protocols. Unifying identity (e.g., who a user is) across vendors and products has been addressed in many different ways with many different protocols, such as SAML, OIDC, Kerberos, etc. Additionally, some aspects of unifying authorization have been attempted through protocols, such as Oauth2. However, the various protocols fall short when used on their own in connection with creation of a unified user experience and common IAM control plane across a set of services spanning multiple private and/or public clouds that are accessible via an MSP in which the set of services may include:

New services being developed from scratch;
Existing internal services owned by an MSP that were previously developed and which leverage multiple different IAM mechanisms; and/or
External services owned and operated by partners, vendors, and/or competitors which may leverage multiple different IAM mechanisms.

In such an environment, the MSP has a set of fundamental challenges associated with providing a common IAM control plane with a cohesive and unified user experience:

The MSP does not own all the UIs;
Access may require identity and authorization;
Every service may have its own methodology of authorization;
End user self-service consumption;
Every customer of the MSP may have their own preferred identity provider;
The MSP does not control the network across providers;
The MSP does not own the resources in external service providers; and
Fully independent service delivery In accordance with embodiments described herein, by enabling a rich set of application programming interfaces (APIs) that allow services to be independent and leverage those parts of a unified IAM control plane that facilitate their respective integration, an MSP is able to coordinate identity and authorization by meeting service integrations where they are and incorporating them at any level of integration (e.g., direct integration, brokered change events, or authentication level enforcement). For example, a first service to be integrated with the unified IAM control plane that does not itself implement IAM may use a subset of the APIs to facilitate a direct integration with the unified IAM control plane in which a centralized IAM service within the MSP maintains access control information on behalf of the first service for resources associated with the first service. Alternatively, a second service that has built-in IAM in the form of a proprietary authorization system may use another subset of the APIs to facilitate brokered change events via the unified IAM control plane in which the unified IAM control plane maintains consistency between the centralized IAM service and the authorization system utilized by the second service. With respect to a third service that has built-in IAM that supports standard SSO authentication, the third service may use yet another subset of the APIs to facilitate injection of claims by the unified IAM control plane into the SSO authentication that may be interpreted and enforced by the third service on a per session basis.

Embodiments described herein further seek to support one or more of the following features:
- A consistent, integrated IAM control plane for all managed services provided by teams, partners, and/or vendors of the MSP;
- IAM concepts familiar to public cloud users (e.g., Google Cloud Platform (GCP) and Microsoft Azure);
- Fully independent product and service delivery release cycles;
- Enable progressive service integration from simple cross launch to being fully embedded in the MSP;
- Protect the customers, partners, and employees of the MSP by providing a service that enables all major IAM security principles (e.g., principle of least privilege, separation of duties, clear and customizable approval chains, ongoing access attestations, and access and auditing transparency);
- Per tenant inbound/outbound authentication via industry standards (e.g., Oauth2, OIDC with Proof Key for Code Exchange (PKCE), SAML, and LDAP); and
- Per tenant local users, groups, Single-Sign-On (SSO) and authorization policies.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As used herein, a "unified Identity and Access Management control plane" generally refers to APIs and associated services that support integration of multiple internal and/or external services, potentially using differing IAM protocols and/or schemes, into a cohesive model. In one embodiment, multiple service integrations are supported by enabling internal and/or external services to plugin to the unified IAM control plane by exposing appropriate APIs (e.g., for retrieval of resources, roles and permissions) and making use of those of a rich set of APIs of the unified IAM control plane as appropriate for the desired level of service integration (e.g., direct integration, brokered change events, and authentication level enforcement). In embodiments described herein, each individual service making use of the unified IAM control plane may use the rich set of APIs, which provide authorization controls utilizing the concepts of resources and permissions, to represent these concepts at a desired level of abstraction. For example, resources represented at a fine level of granularity within an external service may be consolidated into a more coarse-grain representation within the unified IAM control plane and vice versa.

FIG. 1 is a block diagram conceptually illustrating a hybrid cloud environment 100 in accordance with an example embodiment. In the context of the present example, customer users 102 of a Managed Service Provider (MSP) 130 may have the ability to directly access multiple external services provided by cloud providers 120 by providing appropriate credentials to respective authorization systems (e.g., external identity providers 140 or authorization system 121). External services 120 may implement different approaches for IAM. For example, a particular external service may use the authorization system 121 (e.g., LDAP) for authentication of user identity as well as to authorize access to various services 123 and/or resources 124 via APIs 125, while others may use external identity providers 140 (e.g., Okta, Microsoft Azure AD, or Ping Identity) for identity management. In one embodiment, developers/integrators 103 may include an authorization query API within APIs 125 to allow external services 120 to define roles (e.g., administrator, owner, and viewer) and permissions, track resource level authorizations and/or query for authorization of specific requests made on behalf of human users (e.g., customer users 102) or by other users of the services, such as automated processes.

Additionally or alternatively to being able to individually directly access the multiple external services 120, in accordance with embodiments described herein, the customer users 102 and administrators 101 of the MSP 130 may have the ability to access the multiple external services 120 via an interactive, web-based portal 110 associated with the MSP 130. For example, the customer users 120 associated with a particular tenant supported by the MSP 130 may be provided with a unified user experience while interacting with the multiple external services via a user interface (UI) 114 of the interactive portal 110 that is tailored for the particular tenant or that is accessible by multiple tenants supported by the MSP 130.

In embodiments, a centralized IAM service (not shown) may be provided by IAM microservices 133 in which changes made to the permission model 122 via the authorization system 121 are reflected to the centralized IAM service and vice versa as explained further below. According to one embodiment, the UI 114 is able to determine via APIs 131 and associated IAM microservices 133 what permissions a given user has so the UI 114 can display content specific to the particular user. Depending upon the particular implementation, the IAM microservices 133 may be running on a cluster of nodes of a container orchestration platform (e.g., the Amazon Elastic Kubernetes Service (EKS), the Google Kubernetes Engine (GKE)), or the Azure Kubernetes Service (AKS)). Non-limiting examples of the IAM microservices 133 and the APIs 131 are described further below with reference to FIG. 2.

In one embodiment, a customer user 102 may be provided with a full UI in app-experience via UI 114 without requiring manual context switching by the customer user 102 among the multiple external services. For example, once logged into the MSP, the customer user 102 may be provided with the ability to generate and present a report via the UI 114 that is dependent upon data from multiple internal and/or external services they are authorized to use without switching among multiple respective UIs of the multiple services and without the need to separately log in to each of the multiple services. Additionally, administrators 101 (e.g., an identity administrator) may be presented with familiar IAM concepts (e.g., obtaining resources a list of available resources, obtaining a list of users, and/or assigning desired roles and/or permissions for customer users 102). In this manner, customers are provided with the ability to easily understand and manage permissions for their users when using the various integrated services accessible via the MSP 130, operators and/or administrators of the MSP 130 can easily manage access controls across the integrated services, and the services are able to easily and securely control access to their respective resources.

While various examples discuss the permission model 122 (IAM scheme) employed by the authorization system 121 as being represented in the form of an RBAC mechanism defined around coarse-grain roles and privileges, those skilled in the art will appreciate the permission model 122 may implement various other access-control mechanisms. For example, the permission model 122 may implement an access-control mechanism based on ABAC, in which access rights may be granted to users through the use of policies that integrate user attributes, attributes associated with the resource to be accessed, and current environmental conditions, or may use one or more ACLs.

Figure 2:
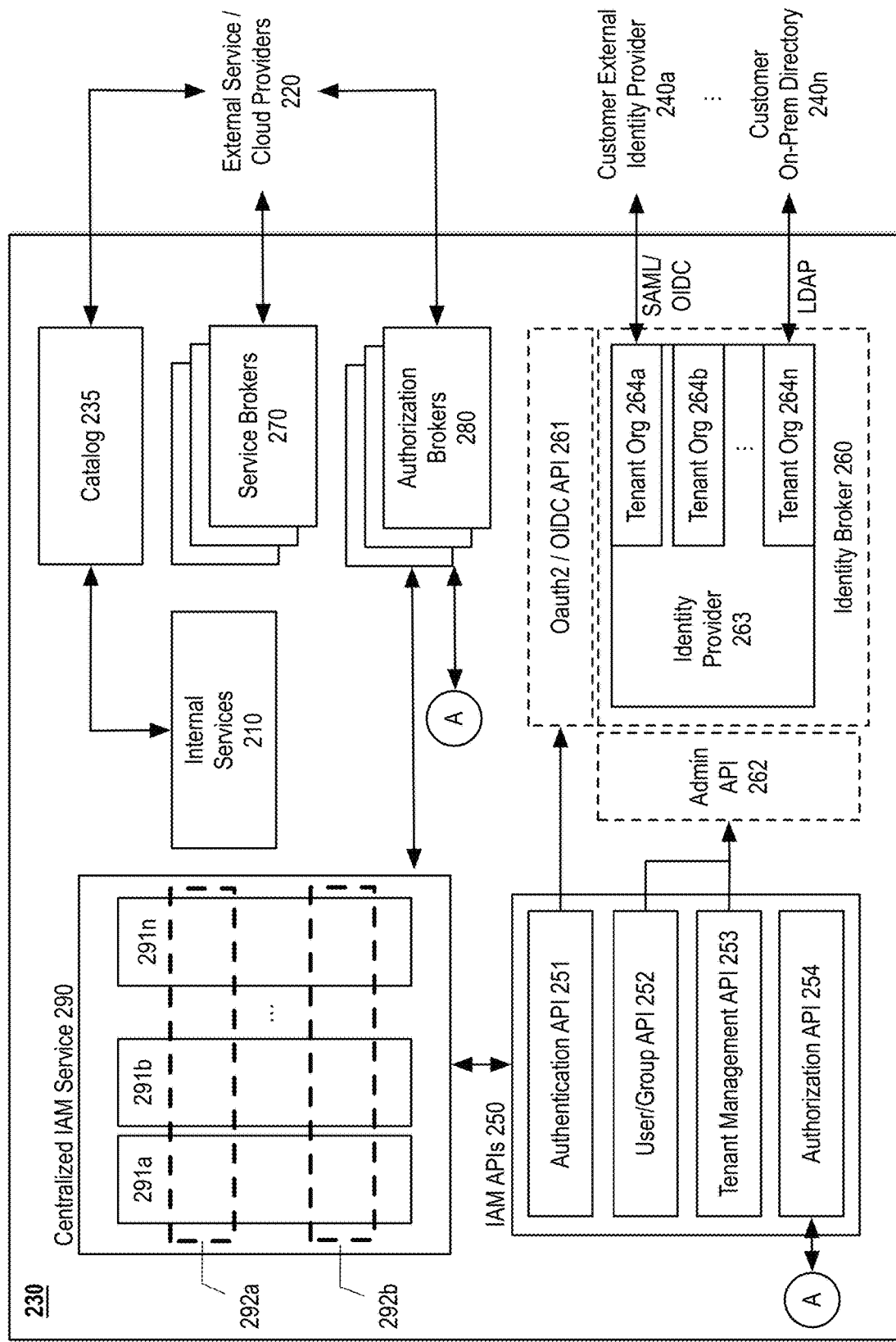
FIG. 2 is a block diagram conceptually illustrating an implementation of a unified Identity and Access Management (IAM) control plane by a Managed Service Provider (MSP) in accordance with an example embodiment.

FIG. 2 is a block diagram conceptually illustrating an implementation of a unified Identity and Access Management (IAM) control plane by a Managed Service Provider (MSP) 230 in accordance with an example embodiment. In the context of the present example, the brokers work against a logical data model of resources and permissions, in which a resource represents whatever level of resource on which a resource provider (e.g., external service 220) can expose authorization controls and permissions represent whatever level of permission on which the resource provider can support managing authorization for the applicable resource. When interacting with a centralized IAM service 290, users (e.g., customer users 102 and/or administrators 101) of the external services 220 managed by the MSP 230 may work with the resource primitives and the permission primitives to assign a user a permission to a resource.

Depending upon the particular implementation, the centralized IAM service 290 may employ an RBAC mechanism or may use a base resource and permission model (which may be referred to herein as space-based access control (SBAC)) that is built into convenient groups (i.e., user groups (groups), permission groups (role), and resource groups (e.g., spaces 292a and 292b), which eases management. In the context of SBAC, these groups may then be inserted into a multi-tenant hierarchy to support dynamic and customizable business levels so that tenants can design and customize access to resources in accordance with their respective needs. According to one embodiment, a space may represent a user and system defined set of resources in which services and users may create named spaces, add and remove resources to and from a space, and filter a resource view by space. A resource generally represents a component that can be governed by IAM. Non-limiting examples of resources include consumption analytics reports, budgets, compliance reports, compliance frameworks, service catalog items and group, and cloud account access. In one embodiment, SBAC provides a more granular approach to access control. For example, using RBAC, a user may be assigned one or more roles on a space (e.g., an R&D space 292a, relating to a first subset of resources spanning a set of production resources 291a, test resources 291b, and development resources 291n or a manufacturing space 292b, relating to a second subset of resources spanning resources 291a-n), in which a role has a set of permissions that are granted to the user for the resources in the assigned space. In this manner, SBAC, extends RBAC by allowing a role to be restricted to a custom defined set of resources.

Assuming the use of SBAC as a foundation for the centralized IAM service 290, an example service integration pattern may involve defining the resource types (e.g., budget, compliance framework, catalog item, Kubernetes cluster) that the service manages and defining the permissions (e.g., actions) that the service uses to gate access to the resources (e.g., view budget, create budget, delete budget).

Additionally, the example service integration pattern may also involve implementation of the resource provider interface (e.g., APIs 125 by developers/integrators 103), and use of the centralized IAM service 290 to perform authorization (e.g., asking what resources a particular user can access and asking whether a particular request is authorized). In one embodiment the resource provider interface facilitates self-registration of resources, services, permissions, roles, features, allows browsing of resources, listens to SBAC changes and enacts internal changes (e.g., to the permission model 122), and emits events when resources are changed or deleted. Furthermore, after the external services 220 have been incorporated into catalog 235, an administrator (e.g., an identity administrator for a tenant) may create a space and assign users a role, by listing/searching/filtering space-able resources and listing users/groups.

In the context of the present example, the unified IAM control plane is represented by various brokers (e.g., identity broker 260, service brokers 270, and authorization brokers 280) and IAM APIs 250 that work cooperatively to integrate external services 220 into the unified IAM control plane.

Service brokers 270 may be used to enable corresponding services to be activated on demand and generally represent integration adapters to expose the external services 220 in a self-service catalog (e.g., catalog 235). Depending upon the particular implementation, the catalog 235 may include and present to users for self-service via a user interface (e.g., user interface 114) a combination of internal services 210 (e.g., associated with a private cloud of a particular customer) and external services 220. Examples of service provisioning by an administrator (e.g., a catalog administrator) and subsequent service usage by a user (e.g., customer users 102) are described further below with reference to FIGS. 5A-B.

According to one embodiment, authorization brokers 280 may include one authorization broker 280 for each external service 220 integrated within the unified IAM control plane. The authorization brokers 280 may generally represent integration adapters for managing independent service access controls via published APIs (e.g., API 125) of the external services 220. The authorization brokers 280 may work with the identity broker 260 to ensure that proper authorization is managed in both the resource provider (e.g., one of the external services 220) and the identity broker 260. The authorization brokers 280 may be responsible for allowing permissions and resources to be published for corresponding external services 220 and for allowing interactions with the permissions and resources within the context of a tenant. The authorization brokers 280 may make use of the centralized IAM service 290 to register configuration and the authorization API 254 to verify permissions. The authorization brokers 280 may also register resources with the centralized IAM service 290 in order to use the authorization API 254 to determine a user's permissions on a registered resource.

In one embodiment, depending upon the particular service integration, authorization brokers 280 can optionally react and respond to events associated with a centralized IAM service 290. For example, a particular authorization broker 280 may make changes to an authorization system (e.g., authorization system 121) employed by its corresponding external service 220. Additionally, a particular authorization broker 280 may make changes to a centralized identity federation (e.g., identity provider 140) for its corresponding external service 220 without changing other aspects of the corresponding external service 220. Examples of interactions between the authorization brokers 280 and the centralized IAM service 290, the identity broker 260, and the external services 220 are described below with reference to FIGS. 6A-D.

According to one embodiment, the identity domain model is designed with a hub, broker, and spoke pattern build on top of an identity provider 263 (e.g., Okta, Azure AD, or Ping), which allows common federation while also (i) maintaining complete separation of authentication policies using industry best practice defaults, (ii) providing fully independent identity provider management across customers, (iii) providing tenant level groups manageable by the customers, and (iv) facilitating MSP and value added reseller level access management to tenants (e.g., tenant organization 264a-n). The identity broker 260 supports a multi-tenant architecture with pluggable identity providers and authorization abstractions and may be used as an integration adapter to integrate external identity providers (e.g., identity providers 140) within the unified IAM control plane. In this manner, the identity broker 260, may interact with the various identity management mechanisms (e.g., customer external identity providers 240a and/or customer on-premises directories 240n) via appropriate IAM protocols (e.g., SAML/OIDC or LDAP) in support of the centralized IAM service 290.

In the context of the present example, the identity broker 260 provides clear separation of boundaries between identity domains and wraps the identity provider 263 within a common set of APIs (e.g., an Oath2/OIDC API 261 and an Administrative API 262) that manage tenants, authentications, users, and groups. Additionally, the APIs provide authorization controls that utilize the concepts of resources and permissions, which each individual service is able to abstract to the desired level in accordance with its needs.

In one embodiment, IAM APIs 250 may be used by the centralized IAM service 290 to interact with the identity provider 263 and may be invoked by various interactions with the user interface by users and/or administrators. In the context of the present example, IAM APIs 250 include an authentication API 251, a user/group API 252, a tenant management API 253, and an authorization API 254. The authentication API 251 may provide the ability to discover identity providers and a facade over industry standard APIs like Oauth, for example, so that the end users of the system interact with the MSP endpoints and are transparently routed to the underlying identity broker. For example, the authentication API 251 may be responsible for performing user identity authentication with the identity provider 263 via the Oauth2/OIDC API 261 of the identity broker 260. The user/group API 252 may provide a facade API with users and groups using industry standards like SCIM over top of the underlying identity provider(s) 263, for example, so that the MSP system presents a unified endpoint. Additionally, user/group API 252 may provide extensions with additional information that unifies user profile information. The tenant management API 253 may allow for the creation and management of sub tenants. This may include managing metadata about the tenant as well as assigning parent tenant users and groups to the sub tenant. The authorization API 254 may provide a unified API to manage and check authorization policies across the multitude of unrelated services connected to an MSP tenant.

According to one embodiment, the IAM APIs 250 support multiple levels of service integration, for example, including direct integration, brokered integration, and authentication level enforcement integration with the unified IAM control plane. Direct integration may involve the use of an "authorized" API, for example, in which services directly check whether or not a specific subject is authorized to perform an action. Brokered integration may involve the use of an "Effective change event API," which may allow third party services to subscribe to change events and react. Authentication level enforcement may involve the use of "IAM App Management APIs," which may include: (i) an "app-assignment-rules" API, in which one may describe conditions in which a user/group should be assigned to a third party app so the user/group may be authenticated; and (ii) a "claim-injection-rules" API through which one may describe conditions that will result in dynamically injecting claims into the authentication response (e.g., SAML or Oauth claims). In one embodiment, by coupling authentication level enforcement with brokered change event, both sides of normally disconnected services may be fully dynamically configured.

The processing described below with reference to the flow diagrams of FIGS. 3 and 4 and the message sequence diagrams of FIGS. 5A-B and 6A-D may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer systems described with reference to FIGS. 9 and 10 below.

Figure 3:
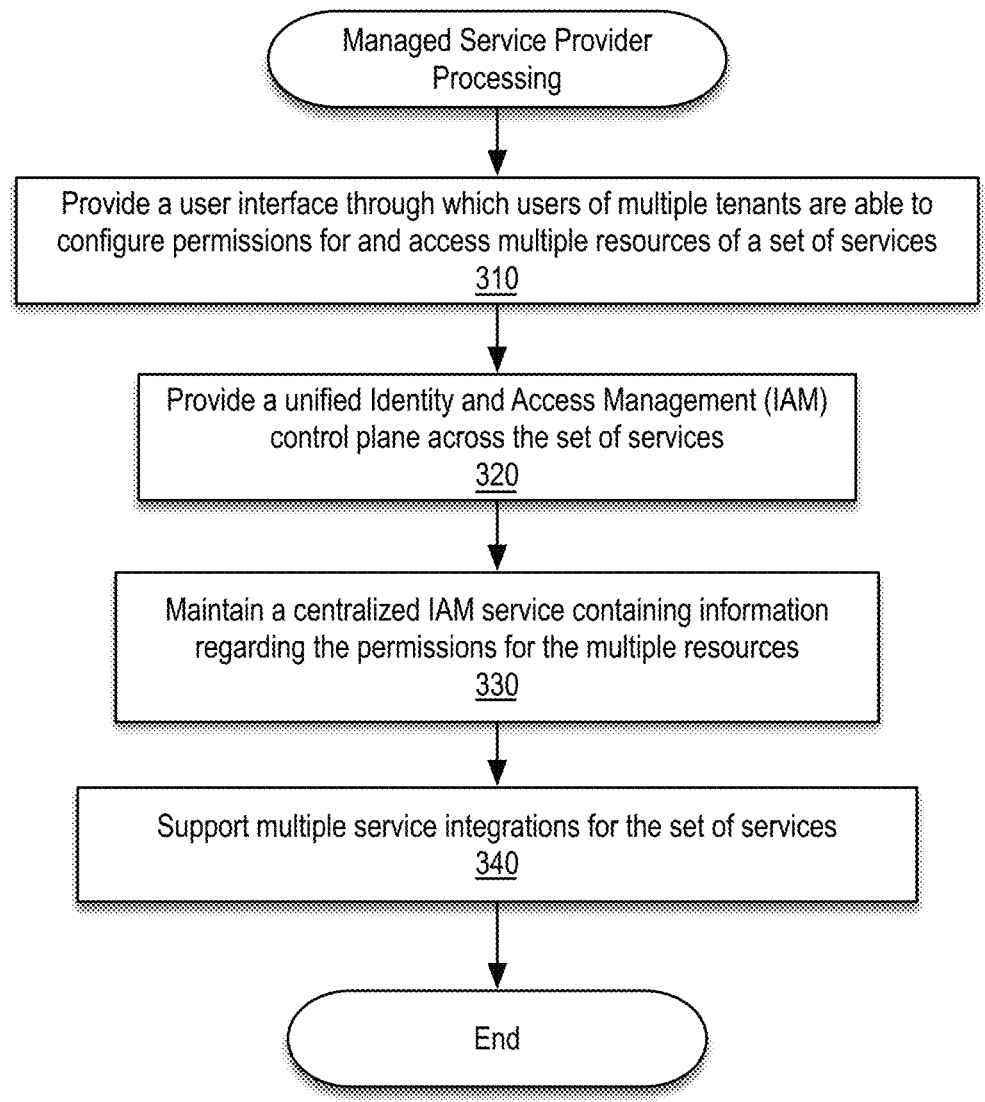
FIG. 3 is a flow diagram illustrating MSP processing in accordance with an example embodiment.

FIG. 3 is a flow diagram illustrating MSP processing in accordance with an example embodiment. The processing described with reference to FIG. 3 includes, among other things, an explanation regarding an example manner in which a unified IAM control plane for services associated with a hybrid cloud may support multiple types of service integration to enable such services, which may be at different points along an IAM continuum (e.g., from a new service being developed from scratch and having no IAM implementation to an existing service having built-in IAM that supports standard SSO authentication) to be integrated within the unified IAM control plane.

At block 310, a UI is provided through which users of multiple tenants are able to configure permissions for and access multiple resources of a set of services. In one embodiment, the set of services (e.g., internal services 210 and external services 220) may be provided by a hybrid cloud computing environment involving a mix of on-premises, private cloud and third-party, public cloud services, and accessed via a UI (e.g., UI 114) of a web portal (e.g., portal 110) associated with the MSP. According to one embodiment, the UI may be generated by a single page application (SPA) that performs most of the user interface logic within a web browser running on a client computer system (e.g., a desktop computer, a laptop computer, or a tablet computer) employed by a user (e.g., customer users 102 or administrators 101) to access the web portal. In various embodiments, the UI provides a unified user experience to those users of the same tenant and allows the users to interact with and receive output associated with multiple services spanning multiple clouds without requiring the users to switch among different browser windows or tabs and without requiring the users to separately manually log in to each of the multiple services.

At block 320, a unified IAM control plane is provided across the set of services. According to one embodiment, the unified IAM control plane is provided in the form of various instances of brokers (e.g., identity broker 260, service brokers 270, and authorization brokers 280) and IAM APIs (e.g., IAM APIs 250) that work cooperatively to integrate external services 220 into the unified IAM control plane.

At block 330, a centralized IAM service is maintained containing information regarding the permissions for the multiple resources. According to one embodiment, the centralized IAM service (e.g., centralized IAM service 290) is associated with the MSP and implements a logical data model of resources and permissions (e.g., an RBAC or SBAC approach) against which the various brokers work. In one embodiment, changes to permissions maintained within the centralized IAM service or an authorization system (e.g., authorization system 121) associated with a particular integrated service may cause appropriate changes to be made in the other. For example, changes to permissions within the centralized IAM service may be asynchronously reflected to the authorization system for the particular integrated service at issue. Similarly, changes to permissions within the authorization system may be asynchronously reflected to the centralized IAM service.

At block 340, multiple service integrations are supported for the set of services. In one embodiment, the IAM APIs of the unified IAM control plane include various sets of APIs that are intended to meet service integrations where they are by allowing them to be plugged into the unified IAM control plane at one of multiple levels of integration. Additionally, should the service integrations evolve or change over time, they may revise the level of integration accordingly. For example, a first set of IAM APIs may be provided to allow a service to be incorporated into the unified IAM control plane that does not itself implement IAM to directly integrate with the unified IAM control plane thereby allowing the centralized IAM service to maintain access control information on behalf of the service. Additionally, a second set of IAM APIs may be provided to allow a service that has built-in IAM that uses a proprietary IAM protocol or scheme, for example, to communicate brokered change events via the unified IAM control plane to trigger appropriate changes in one system responsive to a change in the other so as to maintain consistency between the centralized IAM service and the authorization system utilized by the second service. A third set of IAM APIs may further be provided for the benefit of a service that has built-in IAM that supports standard SSO authentication (e.g., SAML, Oauth, OIDC) to enable the unified IAM control plane to inject claims into the SSO authentication that can then be interpreted and enforced by the service on a per session basis.

Figure 4:
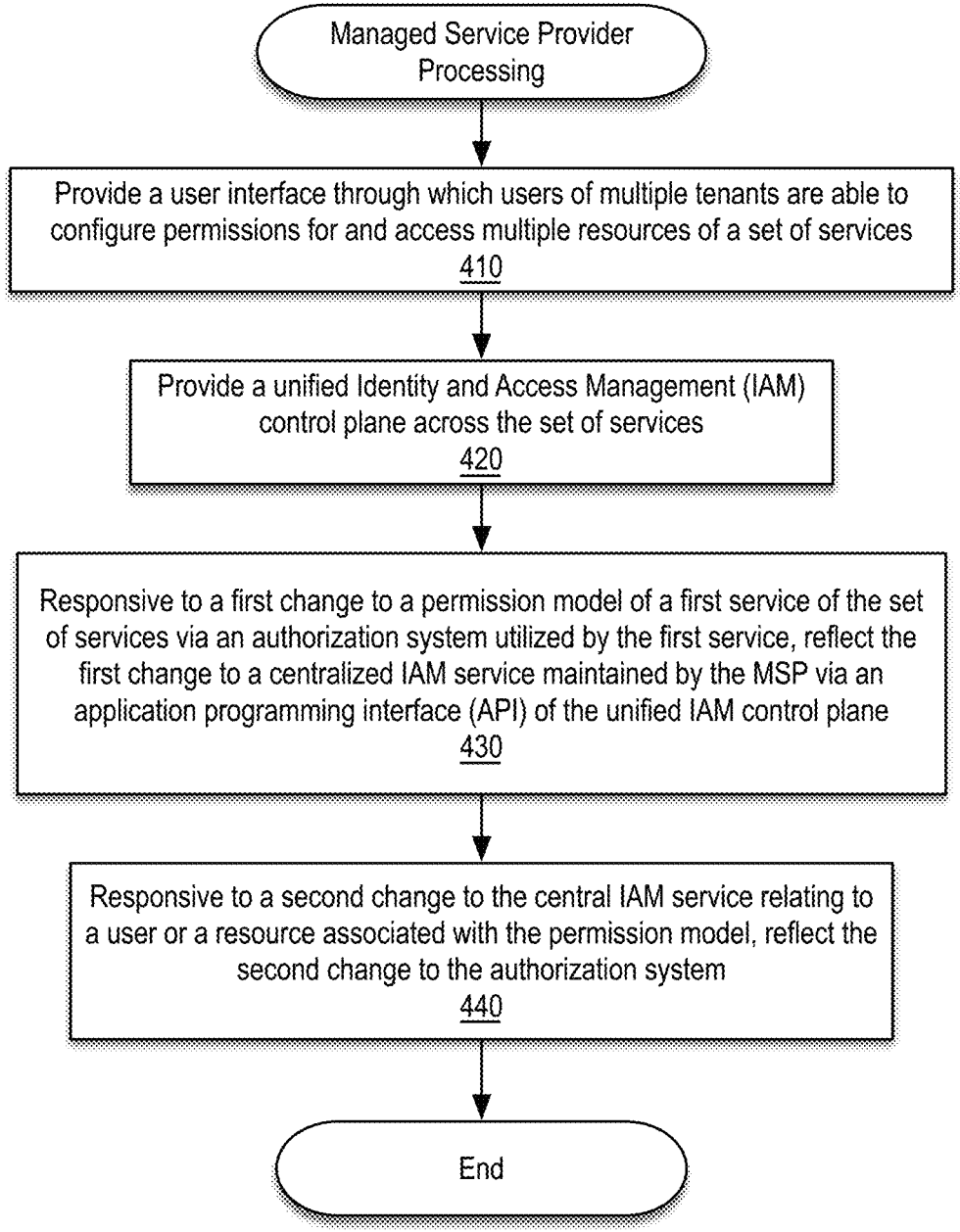
FIG. 4 is a flow diagram illustrating MSP processing in accordance with an example embodiment.

FIG. 4 is a flow diagram illustrating MSP processing in accordance with an example embodiment. The processing described with reference to FIG. 4 illustrates the ability on the part of the centralized IAM service (e.g., centralized IAM service 290) employed by an MSP (e.g., MSP 230) to reflect changes to permissions maintained therein to an authorization system (e.g., authorization system 121 or identity providers 140) utilized by a particular integrated service at issue (e.g., external services 120) and vice versa by communicating brokered change events via a unified IAM control plane implemented by the MSP. In the context of the present example, blocks 410 and 420 generally correspond to blocks 310 and 320, respectively, which have been described above with reference to FIG. 3.

At block 430, responsive to a first change to a permission model of a first service of the set of services via an authorization system utilized by the first service, the first change is reflected to the centralized IAM service by an authorization broker of multiple authorization brokers (e.g., authorization brokers 280) of the unified IAM control plane corresponding to the first service. According to one embodiment, the first change may represent an application, user, or group change or deletion. Depending upon the particular implementation, the unified IAM control plane (e.g., the corresponding authorization broker 280 and/or the identity broker 260) may watch or poll for such changes or register one or more callbacks to be invoked by the authentication system responsive to the occurrence of such changes. Regardless of how the change event is communicated, ultimately an API (e.g., user/group API 252) of the unified IAM control plane may be invoked to cause an appropriate local change or changes to the centralized IAM service.

At block 440, responsive to a second change to the central IAM service relating to a user or a resource associated with the permission model, the second change is reflected to the authorization system. According to one embodiment, the second change may represent an RBAC or an SBAC change event, which is communicated to the appropriate authorization broker. The authorization broker may determine the corresponding change or changes (e.g., a change of user or group permissions, assignment or un-assignment of a user to an application) to be made to the authorization system and issue a request to the authorization system to make the change or changes.

Those skilled in the art will appreciate that the various processing blocks described with reference to FIGS. 3 and 4 may be performed in an order different from that described above. For example, any two blocks that do not depend upon the prior performance of the other may involve performance of one of the two blocks with the other subsequently performed or vice versa.

Figure 5A:
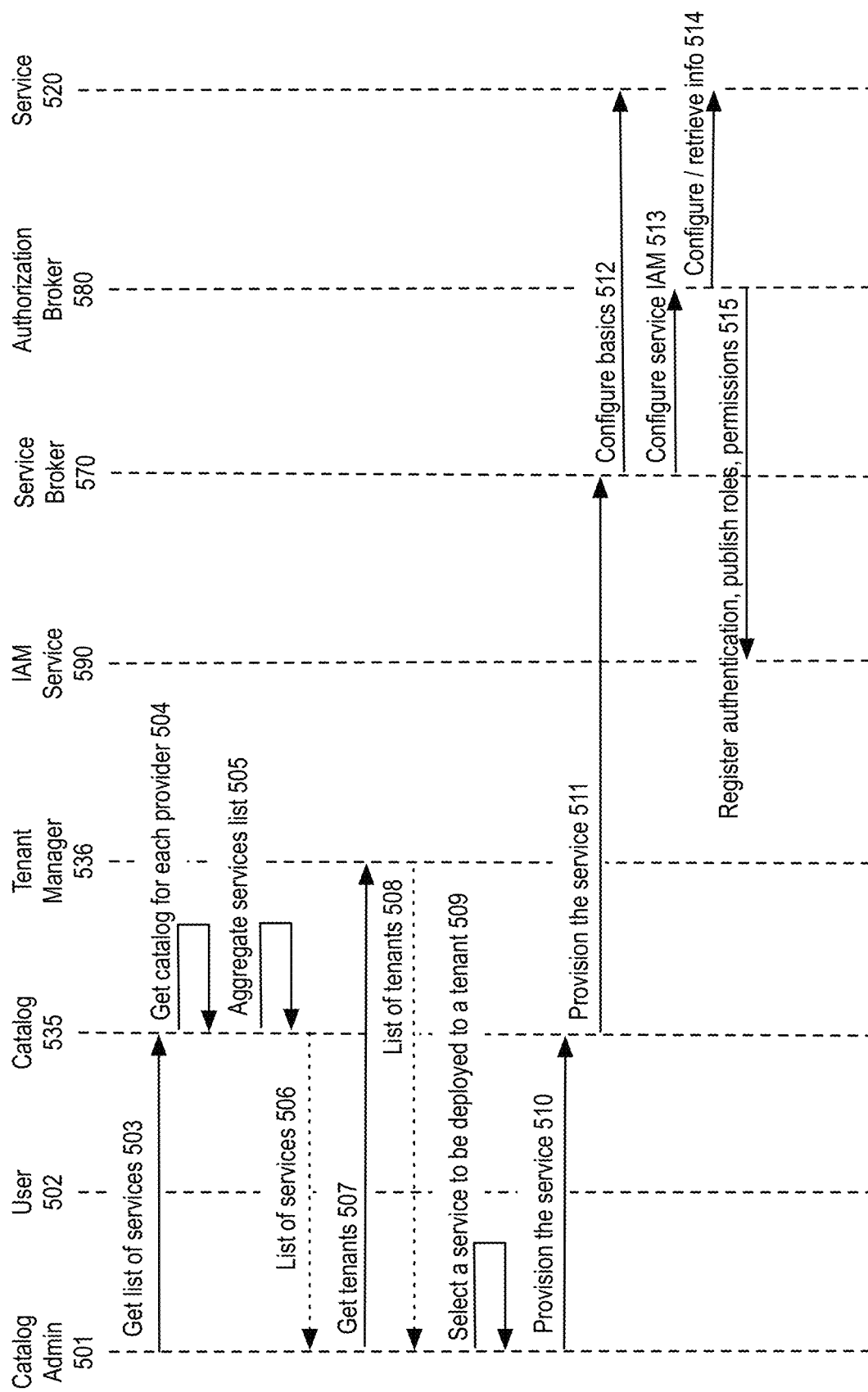
FIGS. 5A-B are message sequence diagrams illustrating service provisioning and usage in accordance with an example embodiment.
Figure 5B:
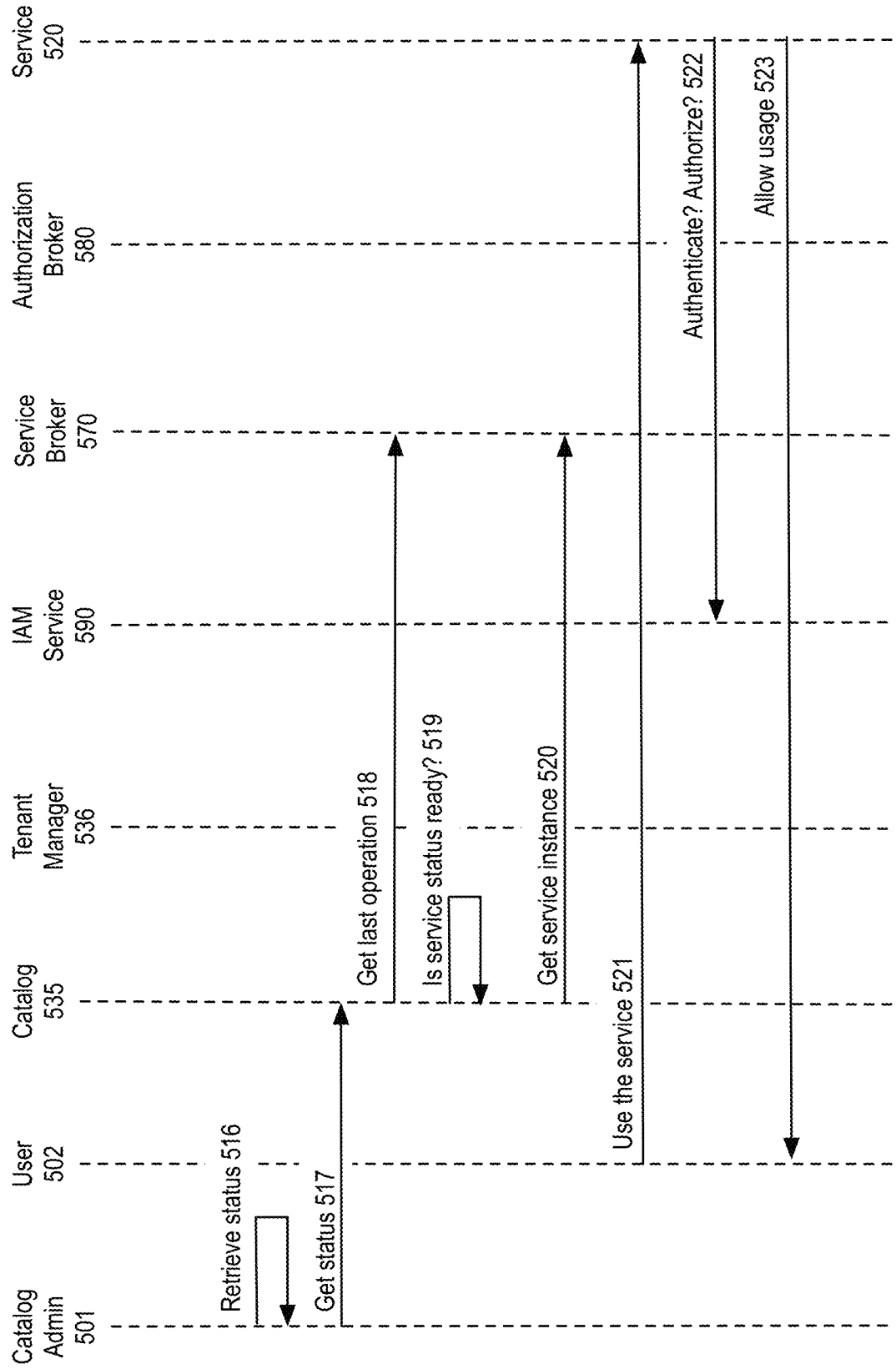

FIGS. 5A-B are message sequence diagrams illustrating service provisioning and usage in accordance with an example embodiment. In the context of the present example, various interactions are illustrated among a catalog administrator 501, a user 502, a catalog 535, a tenant manager 536, an IAM service 590, a service broker 570, an authorization broker 580 and a service 520. As part of service provisioning, the catalog administrator 501 may request a list of services via a user interface (e.g., user interface 114). This request may result in an API call (e.g., GET /catalog) to the catalog 535 to get the list of services 503. The catalog 535 may get a catalog for each registered provider 504, aggregate the services list 505 and return the list of services 506 to the catalog administrator 501 via the user interface.

The catalog administrator 501 may then request a list of tenants via the user interface, which generates a get tenants 507 API call (e.g., GET /tenants) to the tenant manager 536 responsive to which the tenant manager 536 may return the list of tenants 508 to the catalog administrator 501 via the user interface. The catalog administrator may then select a service via the user interface to be deployed to a tenant 509 and request the catalog 535 to provision the selected service 510, resulting in an API call (e.g., PUT /service_instance/{id}) to the catalog 535. The catalog 535, in turn may issue a request (e.g., PUT /service_instance/{id}) for the service to be provisioned 511 to the corresponding service broker 570, causing the service broker via configure basics 512 and configure service IAM 513 to direct the service 520 and the authorization broker 580, respectively, to configure the service.

At this point, the authorization broker 580 may configure the service and retrieve relevant information 514, for example, regarding authentication, roles, and permissions, which can be registered 515 with the IAM service 590.

Responsive to a request to retrieve status 516, the user interface may send a get status 517 request (e.g., Get status (service_instance_id)) to the catalog 535. The catalog 535 may get information regarding the last operation performed by the service broker 570 via a get last operation 518 API all (e.g., GET /last_operation) and based on the result may determine whether the service status is ready 519. When the service status is ready, the catalog 535 may get the service_instance 520 from the service broker 570, for example, via a GET /service_instance/{id} API call. At this point the user 502 may attempt to use the service 521, responsive to which the service 520 may authenticate the user 502 and determine whether the user is authorized to use the service 522 via the IAM service 590. Assuming the user is properly authenticated and is authorized to use the service, the service 520 may allow usage 523.

Figure 6A:
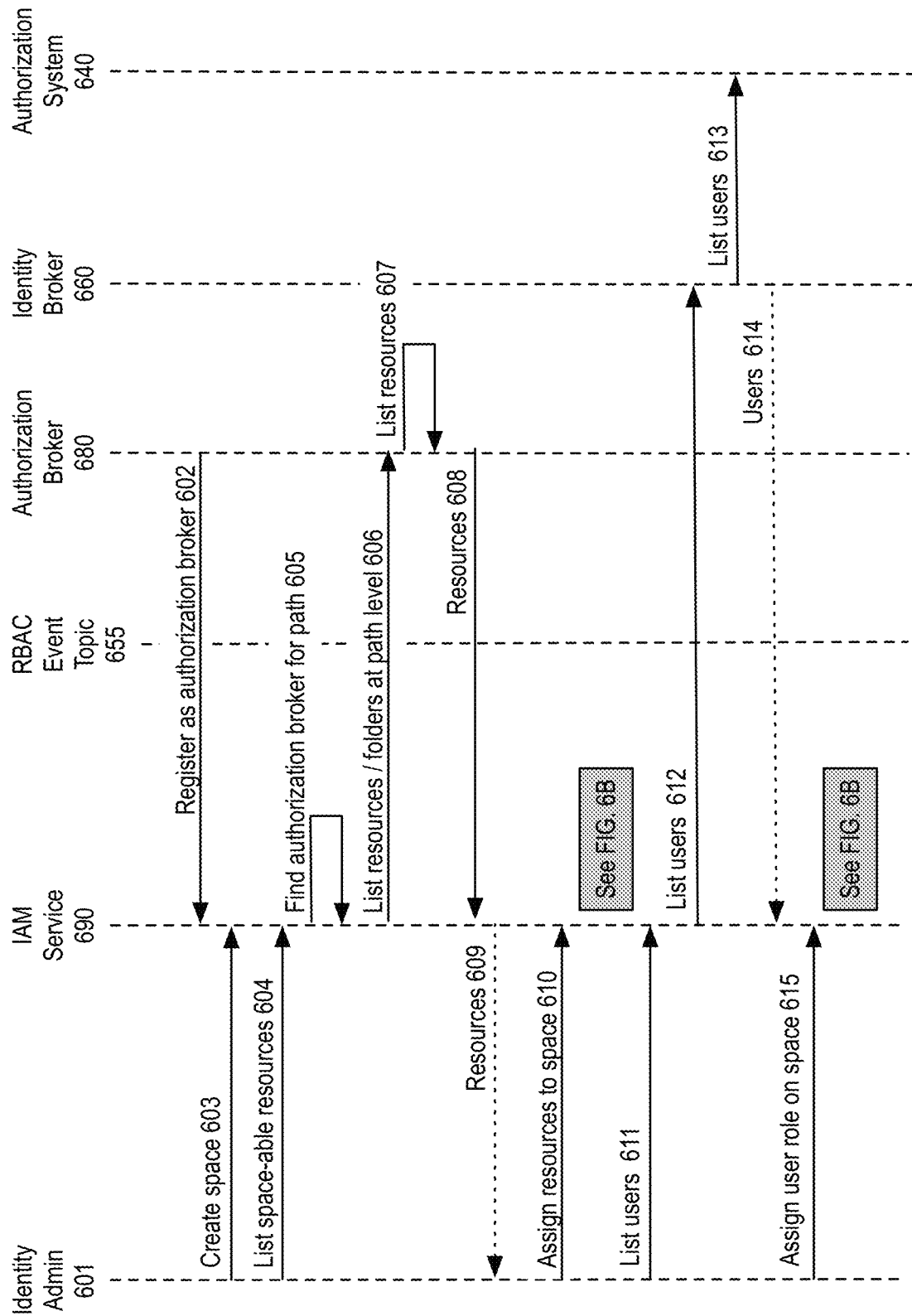
FIG. 6A is a message sequence diagram illustrating space creation and assignments in accordance with an example embodiment.

FIG. 6A is a message sequence diagram illustrating space creation and assignments in accordance with an example embodiment. In the context of the present example, various interactions are illustrated among an identity administrator 601, an IAM service 690, an RBAC event topic 655, an authorization broker 680, and identity broker 660 and an authorization system 690 (e.g., an identity directory, such as Okta or Azure). In this example, APIs are omitted for simplification. As such, the IAM service 690 represents a composite of all services (e.g., centralized IAM service 290) and APIs (e.g., IAM APIs 250) representing a centralized IAM.

In one embodiment, when the authorization brokers startup they each register as an authorization broker 602 with the IAM service 690.

The identity administrator 601 may assign an application to a space and assign a user role on the space by initially creating a space via a user interface (e.g., user interface 114), which causes a create space 603 call to be made to the IAM service 690. The identity administrator 601 may then request a list of resources that may be assigned to a space (e.g., list space-able resources 604) from the IAM service 690. Responsive to the request for the list of resources, the IAM service 690 may find the appropriate authorization brokers (e.g., find authorization broker for path 605) and for each authorization broker with resources in the path, obtain a list of resources/folders at the path level 606 from the authorization broker 680 and return resources 609 to the identity administrator 601 via the user interface responsive to the authorization broker 680 listing the resources 607 and returning the resources 608 to the IAM service.

At this point in the example, the identity administrator 601 may perform the assignment of resources to a space via the user interface, which may make an assign resources to space 610 request to the IAM service 690. An example of processing performed by the IAM service 690 responsive to the assign resources to space 610 request is described below with reference to FIG. 6B.

At this point in the example, the identity administrator 601 request a list of users via the user interface, causing a lists users 611 call to be issued to the IAM service 690 and corresponding list users 612 and 613 calls to be sent to the identity broker 660 and the authorization system 640. When the users 614 are returned by the identity broker 660, the identity administrator 601 may request the IAM service 690 to assign a user role on a space 615. An example of processing performed by the IAM service 690 responsive to the assign a user role on a space 615 request is described below with reference to FIG. 6B.

Figure 6B:
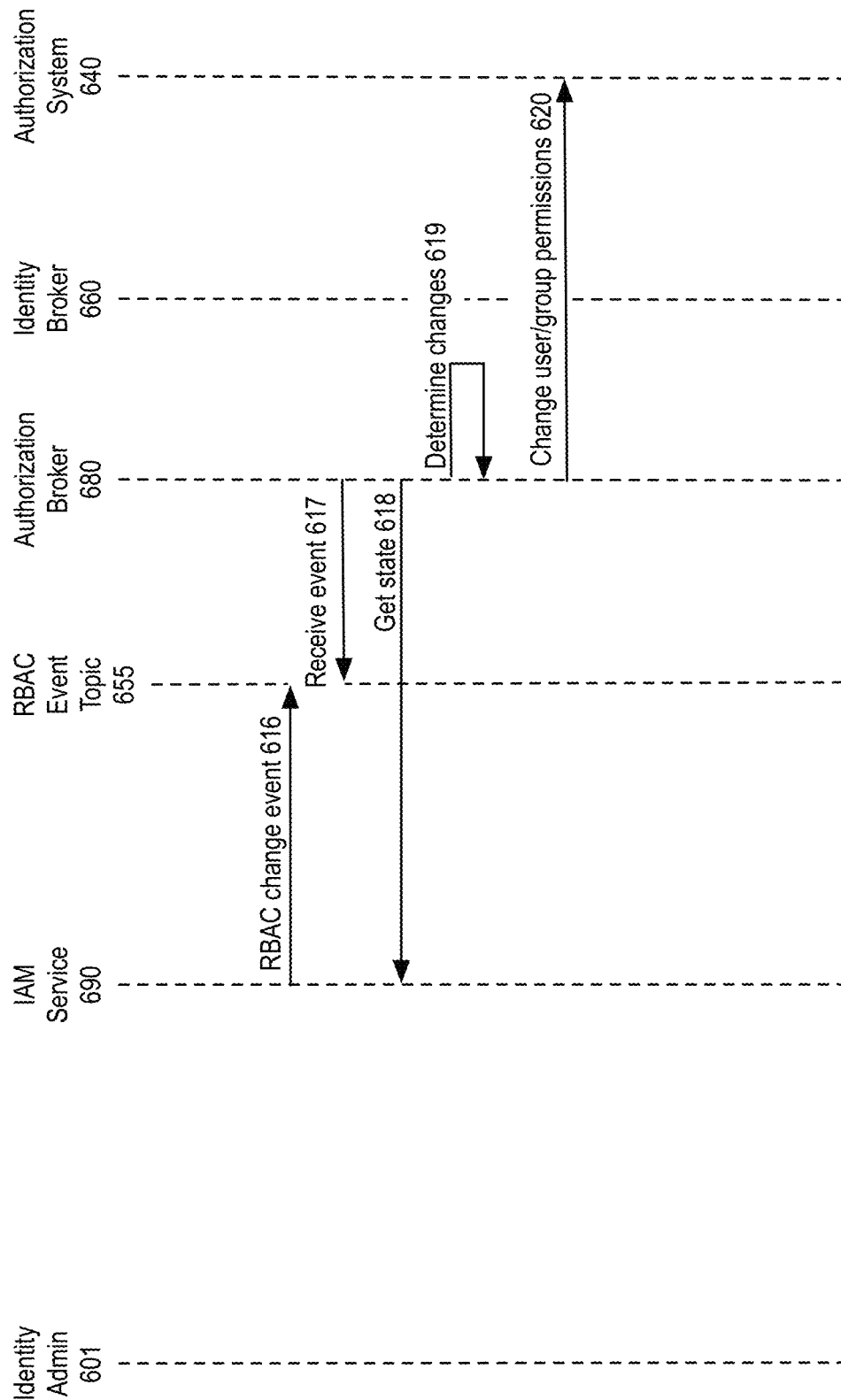
FIG. 6B is message sequence diagram illustrating reflection of changes from a centralized IAM to an identity provider in accordance with an example embodiment.

FIG. 6B is message sequence diagram illustrating reflection of changes from a centralized IAM to an identity provider in accordance with an example embodiment. In the context of the present example, the IAM service 690 responds to RBAC change events (e.g., assignment of a resource to a space or assignment of a user role on a space) by asynchronously communicating the state change at issue to the authorization broker via the RBAC event topic 655, for example, by posting an RBAC change event 616 notification on the RBAC event topic 655. The authorization broker 680 may receive the change event by polling (e.g., receive event 617) the RBAC event topic 655. When a state change event is received by the authorization broker 680, the authorization broker may get the current know state of the changed object (e.g., a space) via a get state 618 request to the IAM service 690 and based on the response may determine changes 619. Based on the determined changes, the authorization broker 680 may direct the authorization system 640 to change user/group permissions 620.

FIG. 6C is a message sequence diagram illustrating reflection of a user or group change via System for Cross-domain Identity Management (SCIM) to a centralized IAM in accordance with an example embodiment. In the context of the present example, assuming an application, user, or group change 621 has been made to the authorization system 640 via SCIM, the change is reflected to the IAM service 690 via an SCIM change notification 622, responsive to which the IAM service 690 performs the change 623 locally, for example, in centralized IAM service 290.

Figure 6D:
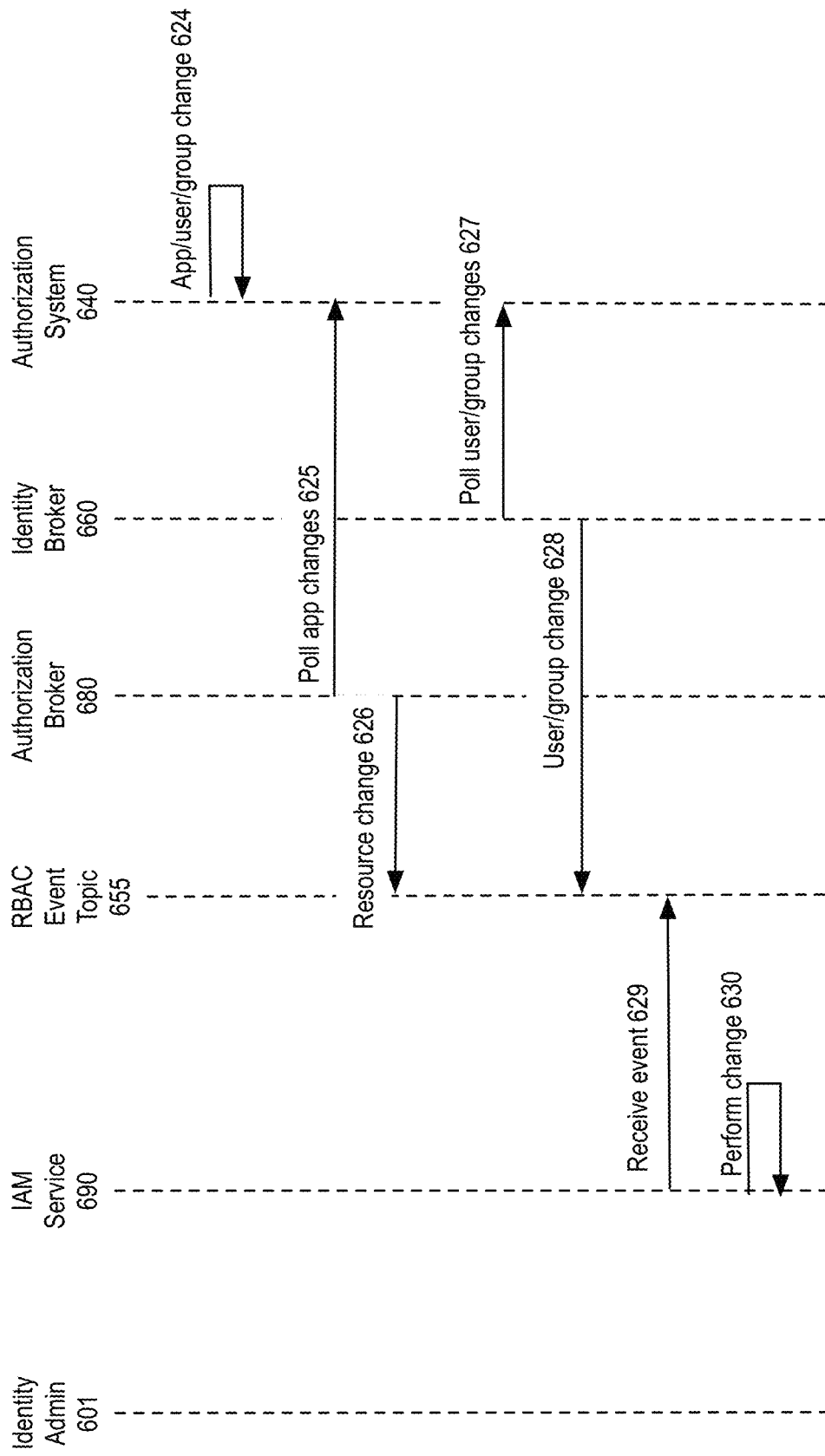
FIG. 6D is a message sequence diagram illustrating reflection of a change to an authorization system of external service to a centralized IAM in accordance with an example embodiment.

FIG. 6D is a message sequence diagram illustrating reflection of a change to an authorization system of external service to a centralized IAM in accordance with an embodiment. In the context of the present example, the authorization broker 680 becomes aware of an application change 624 within the authorization system 640 by polling for application changes (e.g., poll app changes 625) and posts information regarding the resource change 626 to the RBAC event topic 655. Similarly the identity broker 660 becomes aware of a user or group change by polling (e.g., poll user/group changes 627) the authorization system 640 and posts information regarding the user/group change 628 to the RBAC event topic 655. Responsive to receiving an event indicative of a resource change or a user/group change via receive event 629, the IAM service 690 performs the change 630 locally, for example, in centralized IAM service 290.

Figure 7:
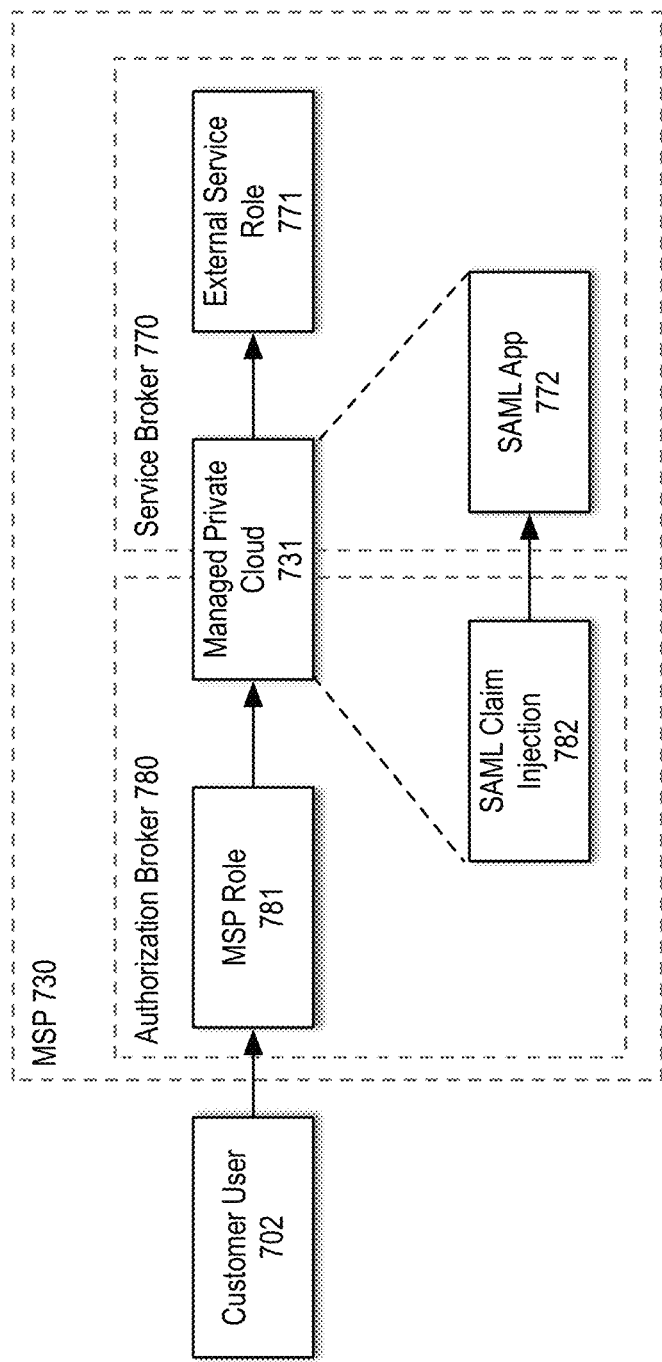
FIG. 7 is a block diagram illustrating IAM plus Security Assertion Markup Language (SAML) claim injection in accordance with an example embodiment.

FIG. 7 is a block diagram illustrating IAM plus Security Assertion Markup Language (SAML) claim injection in accordance with an example embodiment. In the context of the present example, authentication level enforcement is illustrated with reference to a managed private cloud 731 provided by an MSP 730 in which claims are injected into the single sign on (SSO) authentication, which the external service interprets and enforces on a per session basis. An authorization broker 780 of the MSP 730 may publish MSP roles (e.g., MSP role 781) for each external service role 771 to a centralized IAM service (e.g., centralized IAM service 290) and create a predefined/protected external service claims tenant. A service broker 770 may get tenant credentials, setup a trust relationship between the MSP 730 and the service_instance for the tenant. The service broker 770 uses the authorization broker 780, which sets up groups, roles, permissions, and authorization hooks in the external service and within the tenant. When a customer user 702 is assigned the MSP role 781, this may map to a user permission on a resource (e.g., published as an event as described above) and in the context of Oauth and other protocols, for example, may result in a SAML claim injection 782 to a SAML app 772 that receives claim(s) that the external service maps to the corresponding external service role 771.

Figure 8:
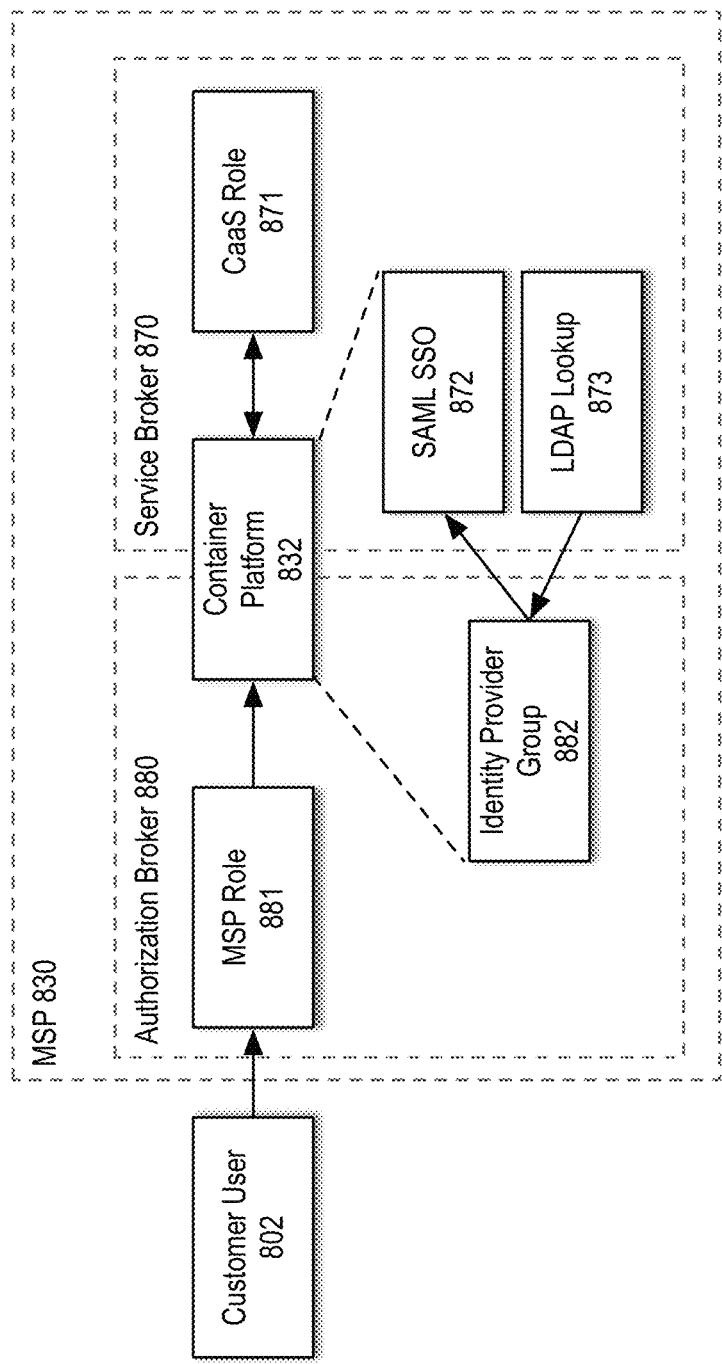
FIG. 8 is a block diagram illustrating SAML plus Lightweight Directory Access Protocol (LDAP) claim injection in accordance with an example embodiment.

FIG. 8 is a block diagram illustrating SAML plus Lightweight Directory Access Protocol (LDAP) claim injection in accordance with an example embodiment. In the context of the present example, authentication level enforcement is illustrated with reference to a container platform 832 provided by an MSP 830 in which claims are injected into the single sign on (SSO) authentication, which the service interprets and enforces on a per session basis. In this example, the customer user 802 may be granted a specific set of permissions associated with the container platform 832 using the standard tools of the IAM API and/or associated UI elements of the MSP 830. Then, when the customer user 802 attempts to login to the container platform 832 either directly or via a cross-launch link or other mechanism, the container platform 832 contacts the MSP 830 to verify the login identity via a SAML authentication request to SAML SSO 872. The MSP 830 may convert the user's granted set of permissions into a set of injected claims to insert into the SAML authentication response. The container platform 832 receives these injected claims in the SAML authentication response and may use them to determine which roles and/or permissions the customer user session should be granted inside the container platform 832. When determining which roles the user session should be granted, the container platform 832 may call back to the MSP 830 via LDAP lookup 873 to determine additional information about the customer user 802, for example, to which groups they belong.

The unified access control can span multiple authentication protocols but within the cloud and in on premise data centers. This bridges the gap between web and cloud native protocols with legacy enterprise protocols. The above interaction uses SAML and LDAP protocols as non-limiting examples of industry standard protocols that may be utilized to communicate. In the context of the present example, the on premise workload can be configured with a single LDAP server configuration that may be pushed to the various underlying workloads that require legacy enterprise authentication. The customer user 802 gains initial access to the web interface using SAML SSO 872 and then via the roles granted via authorization level enforcement will be granted access to the workload that utilize LDAP. The user then authenticates with an LDAP proxy component that intercepts the LDAP requests and performs dynamic group claim evaluation against the IAM policy engine while allowing base authentication to be performed against the on premise corporate directory.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 9:
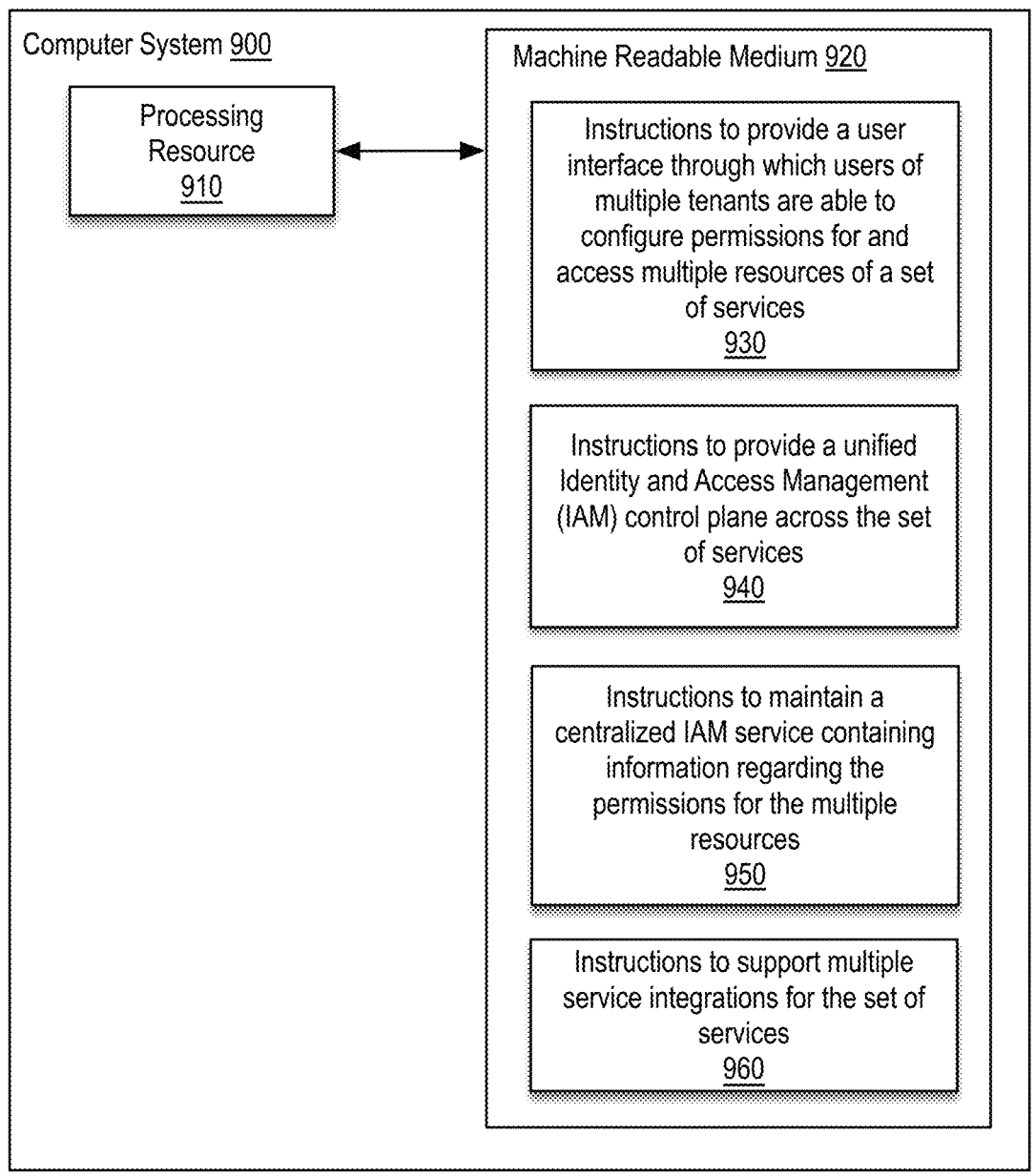
FIG. 9 is a block diagram of a computer system in accordance with an example embodiment.

FIG. 9 is a block diagram of a computer system in accordance with an embodiment. In the example illustrated by FIG. 9, computer system 900 includes a processing resource 910 coupled to a non-transitory, machine readable medium 920 encoded with instructions to perform MSP processing in accordance with an example embodiment. The processing resource 910 may include a microcontroller, a microprocessor, central processing unit core(s), an ASIC, an FPGA, and/or other hardware device suitable for retrieval and/or execution of instructions from the machine readable medium 920 to perform the functions related to various examples described herein. Additionally or alternatively, the processing resource 910 may include electronic circuitry for performing the functionality of the instructions described herein.

The machine readable medium 920 may be any medium suitable for storing executable instructions. Non-limiting examples of machine readable medium 920 include RAM, ROM, EEPROM, flash memory, a hard disk drive, an optical disc, or the like. The machine readable medium 920 may be disposed within the computer system 900, as shown in FIG. 9, in which case the executable instructions may be deemed "installed" or "embedded" on the computer system 900. Alternatively, the machine readable medium 920 may be a portable (e.g., external) storage medium, and may be part of an "installation package." The instructions stored on the machine readable medium 920 may be useful for implementing at least part of the methods described herein.

In the context of the present example, the machine readable medium 920 is encoded with a set of executable instructions 930-960. It should be understood that part or all of the executable instructions and/or electronic circuits included within one block may, in alternate implementations, be included in a different block shown in the figures or in a different block not shown.

Instructions 930, upon execution, cause the processing resource 910 to provide a user interface through which users of multiple tenants are able to configure permissions for and access multiple resources of a set of services. In one embodiment, instructions 930 may correspond generally to instructions for performing block 310 of FIG. 3.

Instructions 940, upon execution, cause the processing resource 910 to provide a unified IAM control plane across the set of services. In one embodiment, instructions 940 may correspond generally to instructions for performing block 320 of FIG. 3.

Instructions 950, upon execution, cause the processing resource 910 to maintain a centralized IAM service containing information regarding permissions for the multiple resources. In one embodiment, instructions 950 may correspond generally to instructions for performing the block 330 of FIG. 3.

Instructions 960, upon execution, cause the processing resource 910 to support multiple service integrations for the set of services. In one embodiment, instructions 960 may correspond generally to instructions for performing block 340 of FIG. 3.

Figure 10:
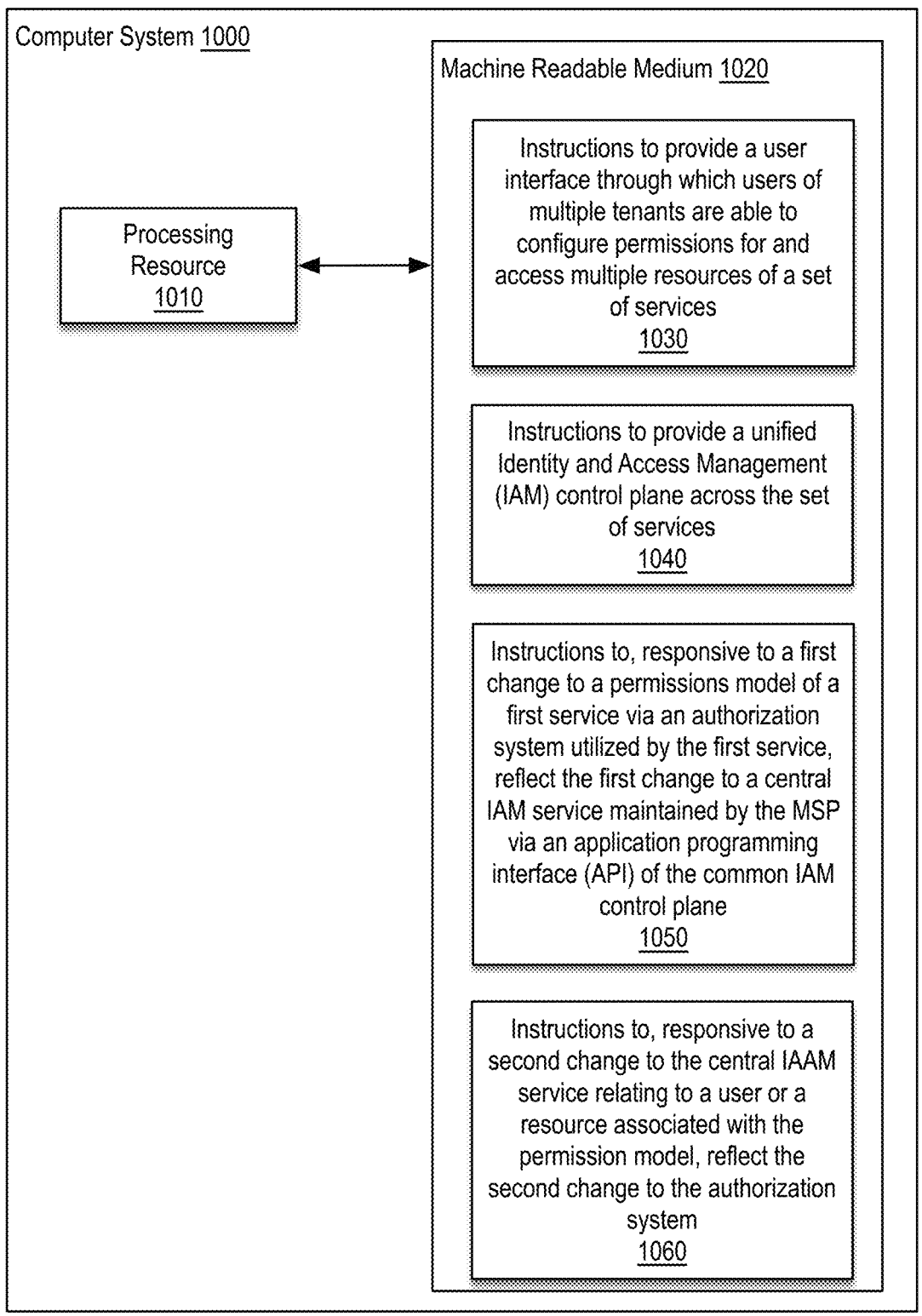
FIG. 10 is a block diagram of a computer system in accordance with another example embodiment.

FIG. 10 is a block diagram of a computer system in accordance with an embodiment. In the example illustrated by FIG. 10, computer system 1000 includes a processing resource 1010 coupled to a non-transitory, machine readable medium 1020 encoded with instructions to perform MSP processing in accordance with an example embodiment. The processing resource 1010 may include a microcontroller, a microprocessor, central processing unit core(s), an ASIC, an FPGA, and/or other hardware device suitable for retrieval and/or execution of instructions from the machine readable medium 1020 to perform the functions related to various examples described herein. Additionally or alternatively, the processing resource 1010 may include electronic circuitry for performing the functionality of the instructions described herein.

The machine readable medium 1020 may be any medium suitable for storing executable instructions. Non-limiting examples of machine readable medium 1020 include RAM, ROM, EEPROM, flash memory, a hard disk drive, an optical disc, or the like. The machine readable medium 1020 may be disposed within the computer system 1000, as shown in FIG. 10, in which case the executable instructions may be deemed "installed" or "embedded" on the computer system 1000. Alternatively, the machine readable medium 1020 may be a portable (e.g., external) storage medium, and may be part of an "installation package." The instructions stored on the machine readable medium 1020 may be useful for implementing at least part of the methods described herein.

In the context of the present example, the machine readable medium 1020 is encoded with a set of executable instructions 1030-1060. It should be understood that part or all of the executable instructions and/or electronic circuits included within one block may, in alternate implementations, be included in a different block shown in the figures or in a different block not shown.

Instructions 1030, upon execution, cause the processing resource 1010 to provide a user interface through which users of multiple tenants are able to configure permissions for and access multiple resources of a set of services. In one embodiment, instructions 1030 may correspond generally to instructions for performing block 410 of FIG. 4.

Instructions 1040, upon execution, cause the processing resource 1010 to provide a unified IAM control plane across the set of services. In one embodiment, instructions 1040 may correspond generally to instructions for performing block 420 of FIG. 4.

Instructions 1050, upon execution, cause the processing resource 1010 to maintain a centralized IAM service containing information regarding permissions for the multiple resources. In one embodiment, instructions 1050 may correspond generally to instructions for performing the block 430 of FIG. 4.

Instructions 1060, upon execution, cause the processing resource 1010 to support multiple service integrations for the set of services. In one embodiment, instructions 1060 may correspond generally to instructions for performing block 440 of FIG. 4.

While computer system 900 and 1000 are illustrated and described separately, in one embodiment, they may be one in the same and all instructions described with reference to FIG. 9 and FIG. 10 may be embodied on a common machine readable medium and executed by a common processing resource.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A system comprising:
 a processing resource; and
 a non-transitory computer-readable medium, coupled to the processing resource, having stored therein instructions that when executed by the processing resource cause the processing resource to:
  provide a user interface via web portal through which users of a particular tenant of multiple tenants of a managed service provider (MSP) are able to configure permissions for and access a plurality of resources of a set of services, including internal services and external services associated with a hybrid cloud;

provide a unified Identity and Access Management (IAM) control plane across the set of services, wherein at least some services of the set of services use a different IAM protocol or a different IAM scheme;

maintain a centralized IAM service containing information regarding the permissions for the plurality of resources, wherein the centralized IAM service is based on a space-based access control (SBAC) model, wherein the SBAC model of the centralized IAM service comprises functions of a role-based access control (RBAC) model; and support a plurality of service integrations for the set of services, including providing:

a first set of application programming interfaces (APIs) that facilitate a direct integration of the plurality of service integrations with the unified IAM control plane in which the centralized IAM service maintains access control information for resources associated with a first service of the set of services; and a second set of APIs that facilitate a brokered integration of the plurality of service integrations with the unified IAM control plane including communicating brokered change events via the unified IAM control plane to trigger a change in a first authorization system responsive to a change in a second authorization system.

2. The system of claim 1, wherein the second set of APIs maintains consistency between the centralized IAM service and an authorization system utilized by a second service of the set of services.

3. The system of claim 1, wherein the instructions further cause the processing resource to provide a third set of APIs that facilitate an authentication level enforcement integration of the plurality of service integrations with the unified IAM control plane in which the unified IAM control plane injects claims into a single sign-on (SSO) authentication protocol implemented by a third service of the set of services that are interpreted and enforced by the third service on a per session basis.

4. A system comprising:
a processing resource; and
a non-transitory computer-readable medium, coupled to the processing resource, having stored therein instructions that when executed by the processing resource cause the processing resource to:
provide a user interface via web portal through which users of a particular tenant of multiple tenants of a managed service provider (MSP) are able to configure permissions for and access resources of a set of services, including internal services and external services associated with a hybrid cloud;
provide a unified Identity and Access Management (IAM) control plane across the set of services, wherein at least some services of the set of services use a different IAM protocol or a different IAM scheme; and
maintain consistency between a centralized Identity and Access Management (IAM) service utilized by the MSP and an authorization system utilized by a first service of the set of services by:
responsive to a first change to a permission model of the first service via the authorization system utilized by the first service, reflecting the first change to the centralized IAM service via an application programming interface (API) of the unified IAM control plane by invoking the API by a first authorization broker of a plurality of authorization brokers running within the MSP and corresponding to the first service; and
responsive to a second change to the central IAM service relating to a user or a resource associated with the permission model, reflecting the second change to the authorization system via the first authorization broker such that brokered change events are communicated via the unified IAM control plane to trigger a change in a first authorization system responsive to a change in a second authorization system, wherein the centralized IAM service is based on a space-based access control (SBAC) model, wherein the SBAC model of the centralized IAM service comprises functions of a role-based access control (RBAC) model.

5. The system of claim 4, wherein the instructions further cause the processing resource to detect the first change by polling the authorization system.

6. The system of claim 5, wherein the first change comprises a change to or deletion of an application, a user or a group.

7. A method comprising:
providing by a managed service provider (MSP):
a user interface through which users of multiple tenants are able to configure permissions for and access a plurality of resources of a set of services, including internal services and external services associated with a hybrid cloud; and
a unified Identity and Access Management (IAM) control plane across the set of services, wherein at least some services of the set of services use a different IAM protocol or a different IAM scheme;
maintaining, by the MSP, a centralized IAM service containing information regarding the permissions for the plurality of resources, wherein the centralized IAM service is based on a space-based access control (SBAC) model, wherein the SBAC model of the centralized IAM service comprises functions of a role-based access control (RBAC) model;
supporting, by the MSP, a plurality of service integrations for the set of services, including providing:
a first set of application programming interfaces (APIs) that facilitate a direct integration of the plurality of service integrations with the unified IAM control plane in which the centralized IAM service maintains access control information for resources associated with a first service of the set of services; and
a second set of APIs that facilitate a brokered integration of the plurality of service integrations with the unified IAM control plane including communicating brokered change events via the unified IAM control plane to trigger a change in a first authorization system responsive to a change in a second authorization system.

8. The method of claim 7, further comprising providing, by the MSP, a third set of APIs that facilitate a brokered integration of the plurality of service integrations with the unified IAM control plane in which the unified IAM control plane maintains consistency between the centralized IAM service and an authorization system utilized by a second service of the set of services.

9. The method of claim 8, wherein the unified IAM control plane maintains consistency by:
- responsive to a first change to a permission model of the second service via the authorization system utilized by the second service, reflecting the first change to the centralized IAM service by a first authorization broker of a plurality of authorization brokers corresponding to the second service; and
- responsive to a second change to the central IAM service relating to a user or a resource associated with the permission model, reflecting the second change to the authorization system via the first authorization broker.

10. The method of claim 9, further comprising detecting the first change by polling the authorization system.

11. The method of claim 7, further comprising providing, by the MSP, a fourth set of APIs that facilitate an authentication level enforcement integration of the plurality of service integrations with the unified IAM control plane in which the unified IAM control plane injects claims into a single sign-on (SSO) authentication protocol implemented by a third service of the set of services that are interpreted and enforced by the third service on a per session basis.

12. A non-transitory machine readable medium storing instructions executable by a processing resource of a computer system, the non-transitory machine readable medium comprising instructions to:
- provide a user interface via web portal through which users of a particular tenant of multiple tenants of a managed service provider (MSP) are able to configure permissions for and access a plurality of resources of a set of services, including internal services and external services associated with a hybrid cloud;
- provide a unified Identity and Access Management (IAM) control plane across the set of services, wherein at least some services of the set of services use a different IAM protocol or a different IAM scheme;
- maintain a centralized IAM service containing information regarding the permissions for the plurality of resources, wherein the centralized IAM service is based on a space-based access control (SBAC) model, wherein the SBAC model of the centralized IAM service comprises functions of a role-based access control (RBAC) model; and
- support a plurality of service integrations for the set of services, including providing:
  - a first set of application programming interfaces (APIs) that facilitate a direct integration of the plurality of service integrations with the unified IAM control plane in which the centralized IAM service maintains access control information for resources associated with a first service of the set of services; and
  - a second set of APIs that facilitate a brokered integration of the plurality of service integrations with the unified IAM control plane including communicating brokered change events via the unified IAM control plane to trigger a change in a first authorization system responsive to a change in a second authorization system.

13. The non-transitory machine readable medium of claim 12, wherein the second set of APIs maintains consistency between the centralized IAM service and an authorization system utilized by a second service of the set of services.

14. The non-transitory machine readable medium of claim 13, wherein the second set of APIs maintain consistency:
- responsive to a first change to a permission model of the second service via the authorization system utilized by the second service, reflecting the first change to the centralized IAM service by a first authorization broker of a plurality of authorization brokers corresponding to the second service; and
- responsive to a second change to the central IAM service relating to a user or a resource associated with the permission model, reflecting the second change to the authorization system via the first authorization broker.

15. The non-transitory machine readable medium of claim 14, further comprising instructions to detect the first change by polling the authorization system.

16. The non-transitory machine readable medium of claim 12, further comprising instructions to provide a third set of APIs that facilitate an authentication level enforcement integration of the plurality of service integrations with the unified IAM control plane in which the unified IAM control plane injects claims into a single sign-on (SSO) authentication protocol implemented by a third service of the set of services that are interpreted and enforced by the third service on a per session basis.

* * * * *